Dec. 29, 1925. 1,567,675
G. L. PITT ET AL
AUTOMOBILE JACK
Filed Feb. 18, 1925   2 Sheets-Sheet 1
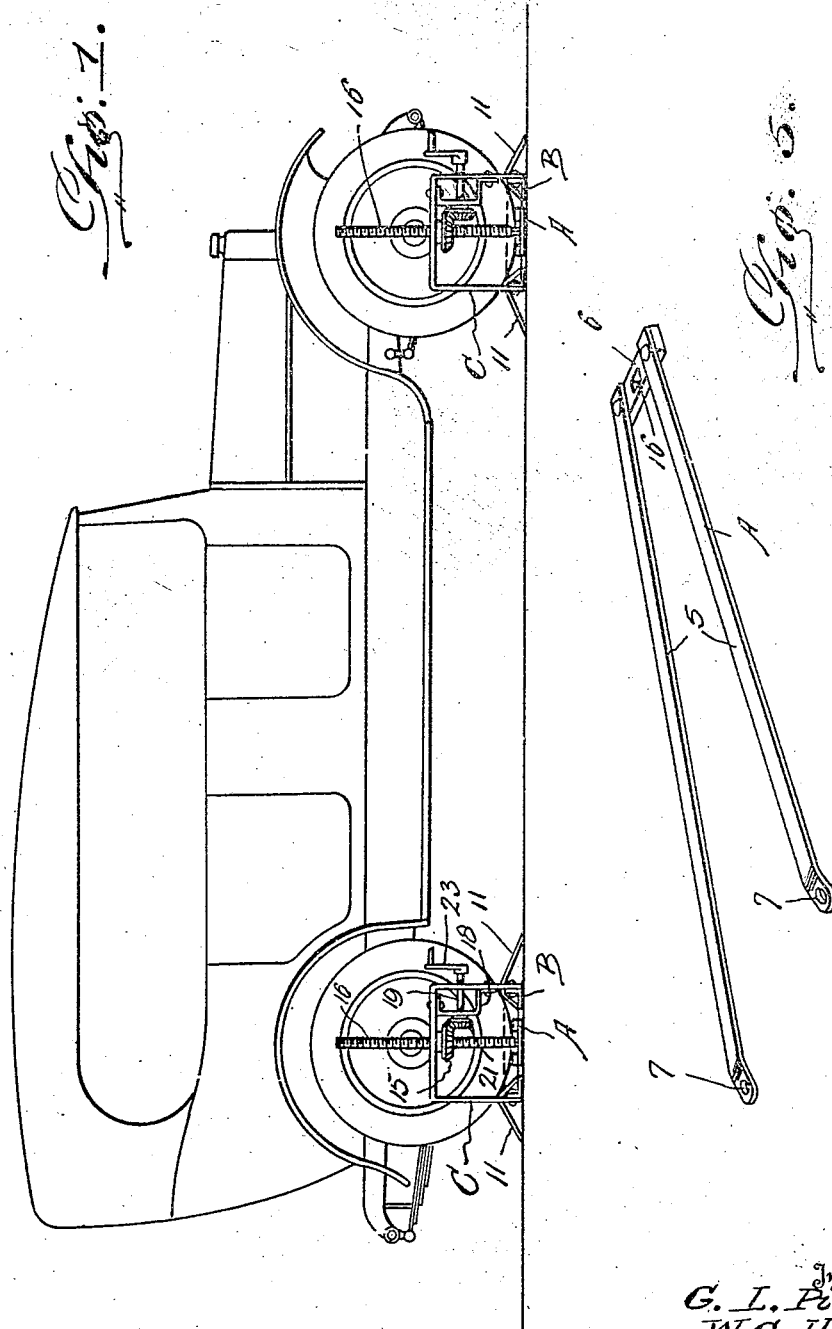
Inventors
G. L. Pitt,
W. G. Harper,
By
Attorney

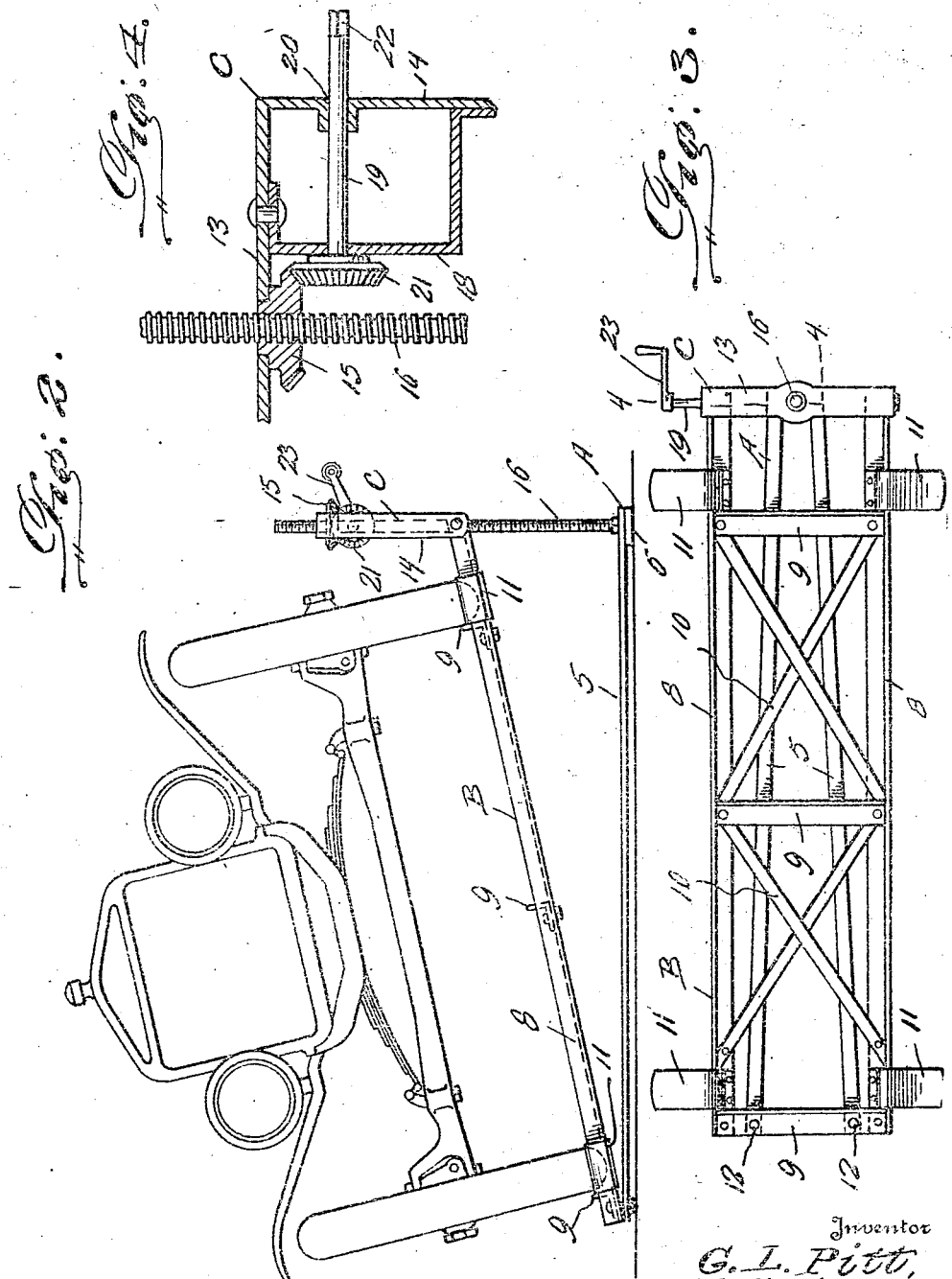

Patented Dec. 29, 1925.

1,567,675

UNITED STATES PATENT OFFICE.

GUY L. PITT AND WALTER G. HARPER, OF ROCKY MOUNT, NORTH CAROLINA.

AUTOMOBILE JACK.

Application filed February 18, 1925. Serial No. 10,008.

*To all whom it may concern:*

Be it known that we, GUY L. PITT and WALTER G. HARPER, citizens of the United States, residing at Rocky Mount, in the county of Nash and State of North Carolina, have invented certain new and useful Improvements in an Automobile Jack, of which the following is a specification.

The present invention relates to a vehicle jack adapted particularly for tilting an automobile in order that work may be conveniently done underneath the same.

An important object of the invention is to provide a jack of this nature formed in two sections upon which the automobile may be run and then operated to tilt the automobile to a convenient position.

Another important object of the invention is to provide a jack of this nature with a tiltable platform for supporting the wheels of an automobile in order that said automobile may be tilted easily.

A still further important object of the invention is to provide a jacking structure of the nature specified which is possessed of a very simple and efficient structure, one which is thoroughly reliable in operation, inexpensive to manufacture, easy to manipulate, not liable to readily get out of order, strong, durable, light, and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a side elevation of an automobile showing the same situated on our improved jack structures, Figure 2 is a front elevation of an automobile on one of the jack structures, Figure 3 is a top plan view of one of the jack structures, Figure 4 is a detail section through one of the jack structures on an enlarged scale taken substantially on the line 4—4 of Figure 3, and Figure 5 is a detail perspective of the base member.

Referring to the drawing in detail it will be seen that two jack structures are provided, one for the front wheels and the other for the rear wheels of the automobile. The automobile is to be driven on these jack structures. As both jack structures are identical, a detailed description of one will be sufficient to impart a clear understanding of both.

The jack structure includes generally a base member A, a platform B, and an operating mechanism supporting frame C.

The base member A includes a pair of resilient bars 5 connected to a cross bar 6 so as to diverge therefrom, the free ends of the bars 5 being apertured as at 7. The platform B includes a pair of longitudinally extending spaced parallel members 8 preferably in the form of angle irons connected by a plurality of transversely extending members 9, and cross braces 10. A pair of plates 11 project outwardly from each longitudinal member 8, one adjacent each end member 9 so that the wheels of the automobile may be run up on the platform and the end transversely extending members 9 will prevent side slipping thereof when the platform is tilted as is shown in Figure 2. Bolts or other suitable fastening elements 12 loosely connect one end member 9 with the extremities of the bars 5 so as to form a substantial hinge connection between one end of the platform and one end of the base member, it being understood that these fastening elements pass through the apertures 7.

The frame C is of an inverted U-shaped formation to include a top rail 13 and side rails 14. The extremities of the side rails 14 are pivotally engaged with the ends of the longitudinal members 8 opposite to the ends supporting the member 9 hinged to the base member. A beveled gear 15 is journaled in the top rail 13 and has an internal screw threaded bore for receiving a screw 16, the lower end of which is reduced and squared for reception in a squared opening 16 provided in the bar 6 so as to prevent turning of this screw. A bracket strip 18 is mounted in one corner of the frame C and a shaft 19 is journaled through one side rail 14 as at 20 and through the strip 18. The inner end of this shaft has fixed thereto a beveled gear 21 meshing with beveled gear 15 while the outer end thereof is squared as at 22 for the reception of a crank or the like 23.

From the above detailed description it will be readily seen that when an automobile is run up onto the platforms B as in Figure 1 by using the inclined plates 11 that this automobile may be tilted to the position such as is shown in Figure 2 by operating the cranks 13 whereby the beveled gear 15 will be caused to travel up the screws 16 carrying with it the frame C and the end of the platform B pivoted thereto. The end members 9 of the platform will prevent side skidding of the automobile as it is being tilted. When in this tilted position ready access may be had to the under parts of the automobile so that efficient work may be accomplished.

The loose connection provided by the bolts or other fastening elements 12 will limit the angle to which the platform B may be disposed in relation to the base member A as, of course, is desirable. The resilient nature of the bars 5 of the base member will aid in providing the hinged association of the platform with the base member since these bars 5 may flex to some extent. It will further be apparent that the embodiment of the invention which we have disclosed by way of example is both simple and efficient in structure and will be thoroughly reliable in its operation. It is desired to point out that numerous changes in the details of construction, in the materials, in the proportions, and in the combination and arrangement of parts may be resorted to without departing from the spirit or scope of the invention as hereinafter claimed or without sacrificing any of its advantages.

Having thus described our invention, what we claim as new is:—

In a device of the class described, a stationary base, a member having one end hinged to one end of the base, a screw rising from the other end of the base, an inverted U-shaped frame having its intermediate portion provided with an opening through which the screw extends, a gear journaled in the opening and threaded on the screw, a bracket strip mounted in one corner of the frame, a crank shaft journaled through the bracket strip and the adjacent side of the same, and a gear fixed to the shaft and meshing with the first mentioned gear, the terminals of the inverted U-shaped frame being pivotally engaged with the other end of the member.

In testimony whereof we affix our signatures.

GUY L. PITT.
WALTER G. HARPER.